US009592892B2

(12) United States Patent
Roodenburg et al.

(10) Patent No.: US 9,592,892 B2
(45) Date of Patent: Mar. 14, 2017

(54) ACTIVE HEAVE COMPENSATION SYSTEM AND METHOD (71) Applicant: ITREC B.V., Schiedam (NL)

(72) Inventors: Joop Roodenburg, Delft (NL); Cornelis Johannes Ekelaar, Rotterdam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 14/750,513

(22) Filed: Jun. 25, 2015

(65) Prior Publication Data

US 2015/0367919 A1    Dec. 24, 2015

Related U.S. Application Data (62) Division of application No. 13/985,905, filed as application No. PCT/NL2012/050081 on Feb. 15, 2012, now Pat. No. 9,079,642.

(Continued)

(30) Foreign Application Priority Data

Feb. 18, 2011   (NL) ..................................... 2006248

(51) Int. Cl.
    *B63B 39/02*    (2006.01)
    *B63B 39/00*    (2006.01)
    (Continued)

(52) U.S. Cl.
    CPC ............ *B63B 39/02* (2013.01); *B60R 16/033* (2013.01); *B63B 39/00* (2013.01); *B63B 2039/105* (2013.01)

(58) Field of Classification Search
    CPC ........ B63B 39/00; B63B 39/02; B60R 16/033
    See application file for complete search history.

(56) References Cited

U.S. PATENT DOCUMENTS 3,304,628 A    2/1967    Kaplan
4,238,037 A    12/1980   Azovtsev et al.
(Continued)

FOREIGN PATENT DOCUMENTS

CN    101130949 A    2/2008
CN    101466591 A    6/2009
(Continued)

OTHER PUBLICATIONS

"Active heave compensation winches offer low weight, power consumption", Winch Technology, XP-001116711, vol. 61, No. 10, p. 140, Oct. 1, 2001.

*Primary Examiner* — Stephen Avila
(74) *Attorney, Agent, or Firm* — Birch, Stewart, Kolasch & Birch, LLP (57) ABSTRACT

An active heave compensation system comprises a motor generator to interact with a load so as to drive the load in a first part of a heave motion cycle and to regenerate at least part of energy with which the load has been driven in a second part of the heave motion cycle, and an electrical storage element for storing the regenerated energy. The active heave compensation system further comprises a power supply electrically connected to the motor generator and the electrical storage element for providing electrical power to at least the motor generator, and a control unit configured to control the power supply substantially in synchronism with the heave motion.

26 Claims, 5 Drawing Sheets

Related U.S. Application Data (60) Provisional application No. 61/444,352, filed on Feb. 18, 2011.

(51) Int. Cl.
    *B60R 16/033*     (2006.01)
    *B63B 39/10*     (2006.01)

(56) References Cited

U.S. PATENT DOCUMENTS

| | | |
|---|---|---|
| 6,392,314 B1 | 5/2002 | Dick |
| 6,468,082 B1 | 10/2002 | Denne |
| 2004/0100231 A1* | 5/2004 | Koerner .................. G05F 1/575 323/265 |
| 2009/0133881 A1 | 5/2009 | Roodenburg et al. |
| 2009/0232625 A1 | 9/2009 | Almeda, Jr. et al. |
| 2011/0237387 A1* | 9/2011 | Yang .................... B60W 10/08 477/5 |

FOREIGN PATENT DOCUMENTS

| | | |
|---|---|---|
| CN | 101713982 A | 5/2010 |
| DE | 34 25 426 A1 | 1/1986 |
| GB | 689 682 | 4/1953 |
| GB | 1 577 744 | 10/1980 |
| WO | WO 2009/120082 A2 | 10/2009 |
| WO | WO 2009/120088 A2 | 10/2009 |

* cited by examiner

ACTIVE HEAVE COMPENSATION SYSTEM AND METHOD

This application is a Divisional of U.S. patent application Ser. No. 13/985,905, now U.S. Pat. No. 9,079,642, filed on Oct. 4, 2013, which is the National Phase of PCT International Application No. PCT/NL2012/050081 filed on Feb. 15, 2012, and which claims priority under 35 U.S.C. 119(e) to US Provisional Application No. 61/444,352 filed on Feb. 18, 2011, and under U.S.C. 119(a) to Patent Application No. 2006248 filed in the Netherlands on Feb. 18, 2011. The entire contents of all of the above applications are hereby incorporated by reference.

The invention relates to an active heave compensation system, a vessel comprising such active heave compensation system and an active heave compensation method.

Heave compensation has been known for many years. Many solutions have been provided, some of which will be discussed below. In general, heave compensation provides for a compensation of heave motion on a load, the heave motion as a result of wave motion. The load may be submerged or partially submerged, thereby being subjected to the wave motion. Also, or instead thereof, it may be the case that the load is held by a floating platform (such as a vessel), which is subjected to the wave motion. Further, many other cases may be imaginable where heave motion may be desired, such as a situation where a load is to be taken from or placed on a floating platform, the floating platform being subjected to wave motion. Heave compensation may be provided for any kind of load, e.g. a load to be carried by a crane or other lifting installation, constructions submerged under water such as pipeline laying equipment, etc. It is to be understood that the above examples are for illustration only, and are not intended to limit the scope of this document in any way.

Heave compensation systems can be subdivided in active and passive heave compensation systems. Combinations of active and passive systems may be provided too. In a passive heave compensation system, a compressible medium is provided in a form of a gas spring, hydraulic system, etc. to provide for a compensation. In an active heave compensation system an actuator is provided to actively compensate for effects of the heave motion. Many constructions have been described in the literature. In general, in an active heave compensation system, use is made of a hydraulic system. As an example, a hydraulic cylinder may be provided which extends and compresses synchronously with the heave motion, thereby interacting with for example a cable holding the load. In each wave, energy is to be supplied to the hydraulic system to exert a force onto the load. Some of the energy may be regained in the other part of the heave motion cycle and e.g. stored by compression of a gas. In the next cycle, the compressed gas can then be applied to drive the load or at least to contribute thereto.

Although hydraulic/gas pressure active heave compensation has been extensively used in many configurations, a disadvantage is that this setup leads to a complex system and involves a risk of leakage of hydraulic fluid, resulting on the one hand in a relatively complex and costly system, while on the other hand requiring regular and secure maintenance to avoid leakage and risks of environmental pollution caused thereby.

Electric heave compensation has been disclosed in WO2009/120066A1. An electric motor drives a load in a first part of a heave motion cycle. Energy is then regenerated by a generator (the motor that acts as a generator) and stored in an electrical storage, such as a capacitor or super capacitor. It is however noted that the solutions as presented therein to control the charging and discharging of a capacitor or super capacitor that acts as an electrical storage element require a bidirectional converter between the motor-generator or power line on the one hand and the capacitor or super capacitor on the other hand.

Accordingly, it is an object of the invention to provide an active heave compensation whereby the bidirectional converter between the energy storage or power line on the one hand and the motor-generator on the other hand, may be omitted.

According to an aspect of the invention, there is provided an active heave compensation system comprising:
  a motor generator to interact with a load so as to drive the load in a first part of a heave motion cycle and to regenerate at least part of energy with which the load has been driven in a second part of the heave motion cycle,
  an electrical storage element for storing the regenerated energy,
  a power supply electrically connected to the motor generator and the electrical storage element for providing electrical power to at least the motor generator, and
  a control unit configured to control the power supply to let an output voltage of the power supply substantially follow, in synchronism with the heave motion cycle, a charging and discharging voltage cycle of the electrical storage element.

The active heave compensation system accordingly comprises a combination of a motor generator and an electrical storage element. In a first part of the heave motion cycle, the motor-generator acts as a motor and drives the load. In a second part of the heave motion cycle, energy is regained and the motor-generator acts as a generator thereby regenerating at least part of the energy with which the load has been driven in the first part of the heave motion cycle. The regenerated energy is stored in the electrical storage element. The stored energy can now be used in a first part of a following heave motion cycle to power the motor-generator. Within the scope of the invention, for the motor generator, use can be made of a separate motor and a separate generator which both interact with the load, however in an advantageous embodiment, use is made of a motor type which acts as a generator, thus a motor which, when not provided with electrical energy, but when mechanically driven by a corresponding motion of the load, generates electrical energy thereby acting as a generator.

Any type of motor generator may be provided, as an example, use may be made of an three-phase asynchronous motor. The term motor generator may in general terms be defined as an arrangement which is adapted to convert electrical energy into motion and to convert motion into electrical energy. The motor generator may comprise a suitable driver such as a so called motor inverter unit that converts a direct current (DC) supply voltage into a switched, alternating electric supply to the motor-generator and vice versa. The power supply may comprise any electrical power delivering device, such as a generator. The power supply may obtain electrical energy from a power grid, such as a power grid of a vessel, e.g. an alternating current (AC) power grid. In case of an alternating power grid, the power supply may for example comprise a so called inverter supply unit to convert electrical energy from the alternating current power grid into a direct current (DC) electrical supply. An output of the power supply may be connected to a power line, such as a direct current (DC) power line, the power supply to supply electrical power to the power line. The motor generator (directly or via its drive unit, such as the motor inverter unit MIU) may be electrically connected to the power line. The electrical storage element may each be electrically connected to the power line. As a result, the electrical storage element (also referred to as energy storage element, electrical storage, energy storage or similar wording) may be connected to the power line without the intervention of a converter to convert a power line voltage into an operational voltage of the electrical storage element, as will be explained below. In accordance with the invention, in order to make the electrical storage element store and release electrical energy in a heave motion cycle, the power supply is controlled substantially in synchronism with the heave motion. Thereby, the power supply can be controlled so as to make the electrical storage element to store energy in a part of the heave motion cycle and to release electrical energy in another part of the heave motion cycle. As an example, an output voltage of the power supply can be controlled: if the voltage is raised, the energy storage element (e.g. the super capacitor) is charged thereby storing energy, while if the voltage is lowered, such energy storage element is discharged. The output voltage of the power supply may hence (e.g. under control of the control unit) be raised in a part of the heave motion cycle wherein the motor generator regenerates energy, so that this energy, or at least a part thereof, is stored in the electrical storage element. In another part of the wave motion cycle, when the motor generator drives the load, hence consumes electrical energy, the power supply may be controlled to lower the power supply voltage, so that the electrical storage element is discharged and the energy released by discharging is at least partly supplied to the motor generator for driving the load. Hence, in synchronism with the heave motion and/or the operation of the motor generator, the power supply causes the electrical storage element to follow a cycle of charging and discharging, so as to cyclically store and release electrical energy, and allowing the electrical storage element to be electrically connected directly to the power line, i.e. without the interposition of a converter, such as a direct current-direct current converter.

Any type of electrical storage element can be used, however it is preferred that a capacitor is applied as a capacitor can provide for a low loss storage, thereby enhancing energy efficiency of the heave compensation system. Preferably, the capacitor comprises a super capacitor, as thereby a high capacitance value, and consequently a high energy storage capacity can be provided in a comparably small volume. Furthermore, a super capacitor may provide for a low series resistance, hence allowing a low loss energy storage, may allow a quick charging and discharging, may provide a high efficiency, and may provide a long operating life. Also a combination of a battery and capacitor, such as a super capacitor can be used as electrical storage element. While a capacitor can provide a high output energy and a battery can provide energy during a relatively long period, a combination could benefit from both features.

In an embodiment, the power supply when controlled by the control unit, may be arranged to provide a substantially constant output current, i.e. an output current that is substantially constant over a heave motion cycle time period. Thereby, a constant load may be provided onto a mains network, generator or other source of energy from which energy is derived, while the energy storage element (without the intervention of a DC/DC voltage converter) takes care of the buffering of energy in each cycle of the driving of the load and regeneration of energy.

The control unit may further control the motor generator so as to drive the load in the first part of the heave motion cycle and to regenerate energy in the second part of the heave motion cycle. The control unit (comprising e.g. a microcontroller, microprocessor, or any programmable logic device, e.g. being provided with suitable program instructions to perform the actions as described) may thereto e.g. control the motor inverter unit associated with the motor-generator. The control unit may thereby control the motor inverter unit such as to power the motor-generator to drive the load in the first part of the cycle and to regenerate at least part of the energy in the second part of the cycle.

The heave motion may be derived from an output parameter of the power supply, such as the output current or output power of the power supply, the cyclic driving the load by the motor generator and the regeneration of energy translating into a power demand from the power supply that follows such cycles. Thereto, in an embodiment, the control unit comprises an input connected to the power supply for measuring an output parameter of the power supply, and an output connected to the power supply for driving the power supply, the control unit being arranged to compare the output parameter of the power supply with a control unit setpoint, and drive the power supply based on the comparison. Hence, from the demand of power onto the power supply, a driving (i.e. controlling) of the power supply is derived so as to allow at least part of the regenerated energy in the second part of the wave motion to be stored in the electrical storage element.

As a suitable output parameter, the output parameter of the power supply may be an output current of the power supply, wherein the output of the control unit is connected to a power supply voltage setpoint input of the power supply. Hence, when energy is regenerated, an output current of the power supply is lowered, and the control unit drives the power supply so as to increase its output voltage so that the regenerated energy from the motor generator can be stored into the electrical storage element, as the increased power supply output voltage, and hence the increased electrical storage element voltage results in a flow of the regenerated energy (in the form of a charging current) into the electrical storage element. As a result, the output voltage of the power supply is cyclically changed substantially in synchronism with the heave motion, causing the electrical storage element to be cyclically charged and discharged substantially in synchronism with the power supply output voltage cycle, so that the cycle of consumption of energy by the motor generator when driving the load and the regeneration of energy is substantially matched by a corresponding discharging and charging of the electrical storage element, so as to buffer at least part of the regenerated energy in the electrical storage element without requiring a converter to interposed between the electrical storage element and the motor generator (or more specifically the motor inverter unit of the motor generator). Due to the controlling of the power supply, a large power supply output voltage swing may be allowed during the heave motion cycle, so that a large voltage swing may be provided onto the electrical storage element, allowing a large amount of energy to be stored into and released from the electrical storage element.

Alternatively or in addition to measuring a power supply output current, the output parameter of the power supply may be a generator frequency signal: a high load on the generator translating into a lower generator frequency, hence allowing to make use of the generator frequency in order to obtain a signal substantially representative of the power supply output current, power supply output power or similar. It is noted that the measurement of a generator frequency as an alternative to measurement of a power supply output current may be applied in any active heave compensation system such as the active heave compensation system as described in WO2009/120066A1, e.g. an active heave compensation system comprising a motor-generator to interact with a load and a control unit which is arranged to control operation of the motor-generator, the control unit being arranged to:

operate the motor-generator to drive the load in a first part of a wave motion cycle, and operate the motor-generator to regenerate in a second part of the wave motion cycle at least a part of the energy with which the load has been driven in the first part of the wave motion cycle, the active heave compensation system comprising an electrical storage element to buffer at least part of the regenerated energy for powering the motor-generator in a following cycle of the wave motion.

A suitable value of the control unit setpoint may be determined by the control unit as follows: The control unit may be arranged to determine the control unit set point from: time averaging an actual power supply output voltage of the power supply, comparing the time averaged actual power supply output voltage with a power supply output voltage setpoint, and deriving the control unit set point from a result of the comparison. Thereby, the power supply may be controlled so as to deliver an amount of energy that corresponds to an average loss the combination of motor generator and electrical storage element, as will be easily understood from the below: The time averaged power supply output voltage, i.e the time averaged power line voltage, corresponds to the time averaged electrical storage element voltage, the electrical storage element being connected to the power line. In case no energy would be added by the power supply, the average power supply voltage would lower, as the electrical storage element would, due to energy losses, get more and more discharged after each heave motion cycle, so that its (e.g. time averaged) operating voltage would lower after each cycle. On the other hand, if the power supply would supply more energy than would be required to compensate for losses the time averaged operating voltage of the energy storage element would increase causing the power supply output voltage to increase, as the power supply output is, via the power line, connected to the energy storage element. Hence, as the control unit keeps the time averaged power supply output voltage at a certain level, it is provided that energy losses are compensated.

In addition to or instead of the above embodiment, it is possible that the control unit comprises an input connected to the power supply for measuring a power supply output voltage, and an output connected to the power supply for driving an output current of the power supply, the control unit being arranged to determine a time average of the power supply output voltage, compare the time averaged power supply output voltage with a control unit setpoint, and drive the output current of the power supply based on the comparison, Hence, information about the heave motion is obtained by the control unit by monitoring the power supply output voltage (which may exhibit a ripple substantially synchronous with the heave motion) and controlling the power supply output current accordingly. An example of such configuration is easily imaginable: in case the power supply has a high output impedance, i.e exhibits a current source behavior, the discharging and charging of the electrical storage element translates into a cycling of the power supply output voltage, due to the charging and discharging of the electrical storage element. The output current of the power supply may now be controlled accordingly so as to compensate for energy losses: in case the time averaged power supply output voltage would lower, an average energy level of the electrical storage element would lower, requiring the power supply to increase its output power to add energy in order to compensate for the losses, and vice versa. Hence, an extremely simple architecture would be provided allowing to control the charging and discharging of the electrical storage element at minimum losses.

The control unit may comprise a heave sensor to measure a heave motion, the control unit being arranged to drive the power supply from the measured heave motion. Hence, instead of or in addition to deriving the heave motion from the power supply output, a sensor may be applied that provides information representative of the heave motion. The sensor may comprise any suitable sensor, such as an accelerometer that measures an acceleration in the heave motion cycle, a position sensor that measures a position or position change as a result of the heave motion, etc. Further, any other type of sensor may be applied, such as a camera or an (e.g. infrared, radio-wave or ultrasound) distance measurement unit, etc. that detects a wave motion, the control unit to determine a heave motion estimate from the detected wave motion. Still further, a stationary reference may be applied by the sensor for measurement of the heave motion, e.g. an object (a wind turbine, a drilling platform mounted to a seabed, a satellite system reference, etc.)

The electrical storage element may comprise a super capacitor. The super capacitor (also referred to as ultra capacitor) may provide for a large capacitance value hence (given a certain operating voltage range) store a large amount of energy.

The electrical storage element may comprise a plurality of super capacitors and a voltage balancing to balance an operating voltage of the super capacitors, so that imbalances in operating voltage of series connected super capacitors, due to for example spread in capacitance value, aging, spread in leakage, etc. may be reduced. The voltage balancing may for example comprise resistive elements in parallel to individual or groups of parallel super capacitors, the resistive elements for example comprising resistors, transistors, such as field effect transistors of which the channel is applied as a resistor, the latter allowing to control a resistance value by a suitable electrical drive of its gate.

The super capacitors may be arranged in at least one super capacitor bank, the or each super capacitor bank comprising two parallel circuit boards, the super capacitors of the respective super capacitor bank being arranged and extending between the circuit boards. An air flow (forced or passive) may be provided so as to flow along the circuit boards, allowing temperature conditioning of the supercapacitors. In particular, an air flow along electrical contacts of the super capacitors may be provided as the electrical contacts provide for a low thermal resistance, allowing cooling of the super capacitors.

In order to allow a precise driving of the motor generator so as to apply heave motion compensating forces onto the load in synchronism with the heave motion cycle and in a correct amount, the control unit may comprise a sensor for measuring a variable representative of a heave motion to be compensated, the control unit being arranged to drive the motor generator on the basis of the measured variable. The motor generator may be driven directly. Also, it is possible that the motor inverter unit of the motor generator is driven. The sensor may comprise any suitable sensor, such as an accelerometer that measures an acceleration in the heave motion cycle, a position sensor that measures a position or position change as a result of the heave motion, etc. Further, any other type of sensor may be applied, such as a camera or an (e.g. infrared, radio-wave or ultrasound) distance measurement unit, etc. that detects a wave motion, the control unit to determine a heave motion estimate from the detected wave motion. Still further, a stationary reference may be applied by the sensor for measurement of the heave motion, e.g. an object (a wind turbine, a drilling platform) mounted to a seabed, a satellite system reference, etc.). It is to be understood that these measurement principles may not only be applied in the active heave compensation system as disclosed in this document, but in any active heave compensation system, such as a heave compensation system comprising the motor generator to interact with the load and a capacitor, super capacitor or other electrical storage to store at least part of the electrical energy regenerated by the motor generator.

Many configurations are possible. The load may comprise an (e.g. solid) vessel motion damping ballast which is movable in a transverse or longitudinal direction of a vessel so as to at least partially compensate a heave motion of the vessel. The vessel may thus comprise one or more motion damping ballasts which are movable in transverse respectively longitudinal direction of the vessel. Suitably moving such a motion damping ballast in the longitudinal direction may reduce a heave motion of the vessel in the longitudinal direction, and suitably moving such a motion damping ballast in the transverse direction may reduce a heave motion of the vessel in the transverse direction. The active heave compensation system as described in this document may accordingly be applied to drive the motion damping ballast by the motor generator in a first part of the heave motion cycle and regenerate at least part of the energy with which the motion damping ballast has been driven, in a second part of the heave motion cycle. The regenerated energy may then at least partly be stored in the electrical storage element. Another example may be a crane comprising the active heave compensation system in accordance with the invention, or a drilling vessel comprising the active heave compensation system in accordance with the invention. As another example, there is provided a vessel comprising an active heave compensation system in accordance with the invention.

According to a further aspect of the invention, there is provided an active heave compensation method comprising:
driving the load by a motor generator in a first part of a heave motion cycle
regenerating at least part of energy with which the load has been driven in a second part of the heave motion cycle,
storing the regenerated energy in an electrical storage element,
providing by a power supply electrical power to at least the motor generator, the power supply being electrically connected to the motor generator and the electrical storage element, and controlling by a control unit the power supply to let an output voltage of the power supply substantially follow, in synchronism with the heave motion cycle, a charging and discharging voltage cycle of the electrical storage element.

With the active heave compensation method according to the invention, the same or similar advantages may be achieved as with the heave compensation system according to the invention. Also, the same or similar embodiments as disclosed in respect of the active heave compensation system according to the invention, also apply to the active heave compensation method according to the invention, thereby achieving same or similar effects as the corresponding embodiment of the active heave compensation system according to the invention.

Further features effects and advantages of the invention will become clear from the appended drawings and corresponding description, in which non-limiting embodiments of the invention are disclosed, wherein:

FIG. 5A shows another embodiment of the heave compensation system according to the invention, while

FIG. 6A shows another embodiment of the heave compensation system according to the invention, while

It is noted that throughout the figures, the same reference numerals and reference symbols refer to the same or similar items having same or similar functions.

Figure 1:
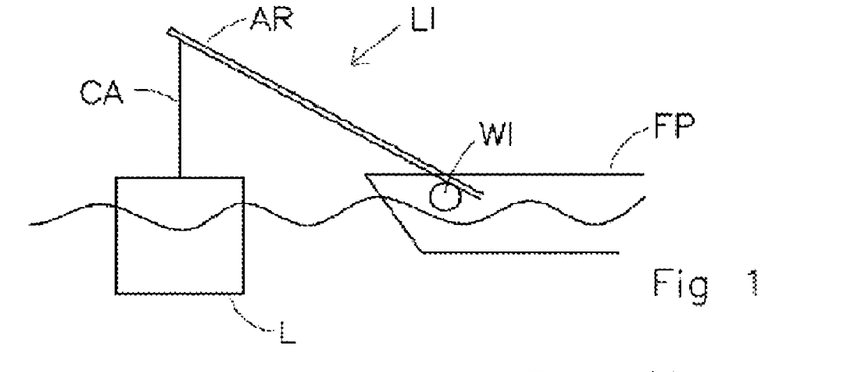
FIG. 1 shows a highly schematic configuration of a load submerged from a floating platform.

FIG. 1 shows a highly schematic view of a partly submerged load L held by a lifting installation LI such as a crane, the lifting installation LI being positioned on a floating platform FP such as a vessel. The wave motion will result in vertical forces, thereby providing a periodic vertical movement of the load L as well as the floating platform FP. As a result thereof, forces will act periodically on the cable CA of the lifting installation LI. The heave compensation is intended to compensate for the heave motion cycle movements, to thereby avoid possible damage of the load, overloading the cable CA of the lifting installation LI, etc. Although in FIG. 1 an example is shown where both the load and the platform holding the lifting installation LI are partly submerged, it is also possible that one of the load and the lifting installation is on shore or mounted to a solid reference, as an example the lifting installation may be mounted on a wharf, or the load is to be placed on the wharf while the lifting installation is mounted on a floating platform. Many other configurations are possible. For example, the load is submerged and is required to be stabilised, while the floating platform holding the lifting installation is subjected to the heave motion. The cable CA is wound on winch WI. Actuating the winch WI to wind up the cable CA will lift the load L and vice versa.

Figure 2:
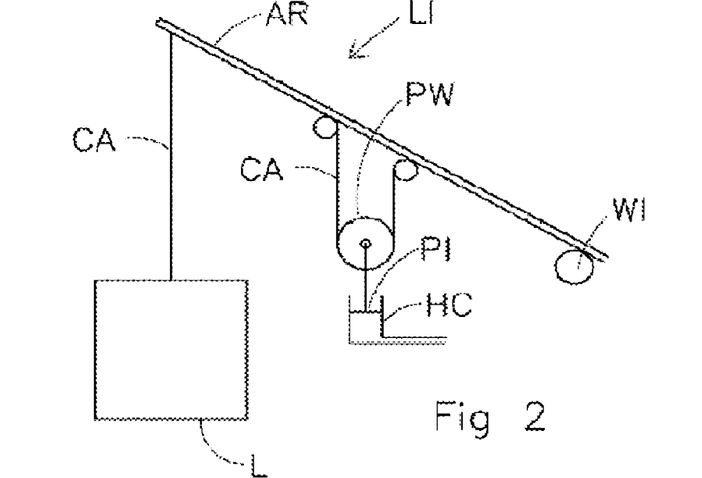
FIG. 2 shows a highly schematic heave installation having a compensation.

FIG. 2 highly schematically shows an example of a construction that may be applied in a conventional heave compensation system again showing the lifting installation LI having a cable CA holding a load L. The cable CA is guided via a pulley wheel PW which is connected to a hydraulic cylinder HC. By downwardly moving a piston PI of the hydraulic cylinder HC, the pulley wheel which is connected to the piston, is also moved downwardly. Thereby, a length of a loop of the cable CA guided via the pulley wheel PW is altered in length, which will cause the load to be lifted respectively lowered depending on the direction of movement of the piston PI. The hydraulic cylinder HC may be actively driven, thereby obtaining an active heave compensation system. Also, or in addition thereto, it is possible that use is made of a gas spring, e.g. formed by an enclosed volume with compressible gas, which acts on a hydraulic system of which the hydraulic cylinder HC forms part.

Figure 3:
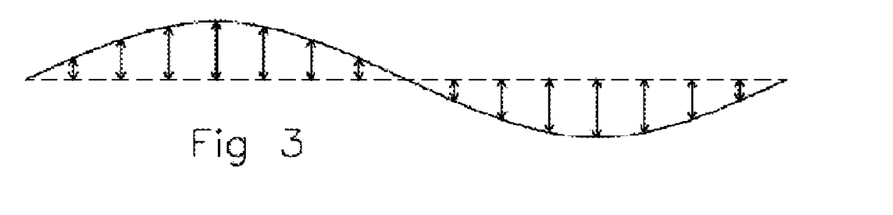
FIG. 3 shows a highly schematic representation of a wave motion.

As schematically illustrated in FIG. 3, a wave motion cycle will result in a periodic pattern of upward and downward forces on either the load, the lifting installation, or both.

Figure 4:
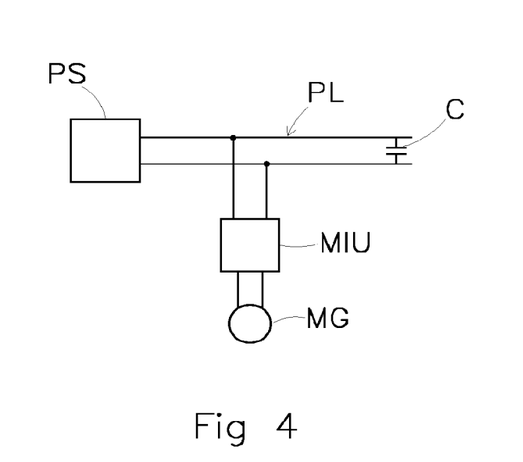
FIG. 4 shows a highly schematic representation of a heave motion compensation system according to the invention.

FIG. 4 depicts a heave compensation system, comprising a motor generator MG that interacts with a load (not depicted). The motor generator MG is powered from a power line PL, such as a direct current (DC) power line. A power supply PS is connected to the power line for providing electrical power to the power line. The power supply may comprise an electrical power supply that is arranged to convert for example an alternating current mains electrical supply (such an AC power net on a vessel) into a direct current supply. Furthermore, the power supply may comprise a generator. An electrical storage element C, such as a capacitor or super capacitor, is electrically connected to the power line. The motor generator corn comprise a suitable drive unit, such as a so called motor inverter unit that comprises a plurality of switches in order to provide a correct polarity from the electrical power supply line to the motor generator, the motor inverter unit thereby effectively transferring the DC supply voltage at the power line into an AC voltage drive of the motor generator and vice versa during regeneration of energy.

In a first embodiment, the power supply is a constant current power supply, such as a current source. The term constant current is to be understood as the power supply providing an output current that is substantially constant over e.g. a time period of the heave motion cycle. When the motor generator drives the load, a current consumption of the motor generator exceeds the current supplied by the power supply. Hence, the remainder of the current required for operating the motor generator is provided by the electrical storage element, e.g. the super capacitor which is discharged thereby. During a following part of the heave motion cycle, electrical energy is regenerated, the motor generator (e.g. via its motor inverter unit MIU) delivers an electrical current that is stored—together with the current provided by the power supply, into the electrical storage element. Hence, each heave motion cycle, electrical energy is cycled between the motor generator and the electrical storage element, i.e. cycled between mechanical energy and electrical energy each heave motion cycle. Apart from the motor inverter unit as applied in the present embodiment, no electrical conversion is required. The electrical power supplied by the power supply is set to as level so as to compensate for losses due to dissipation.

Figure 5A:
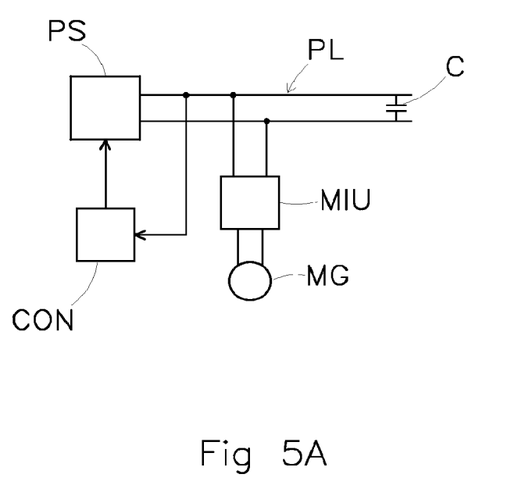
Figure 5B:
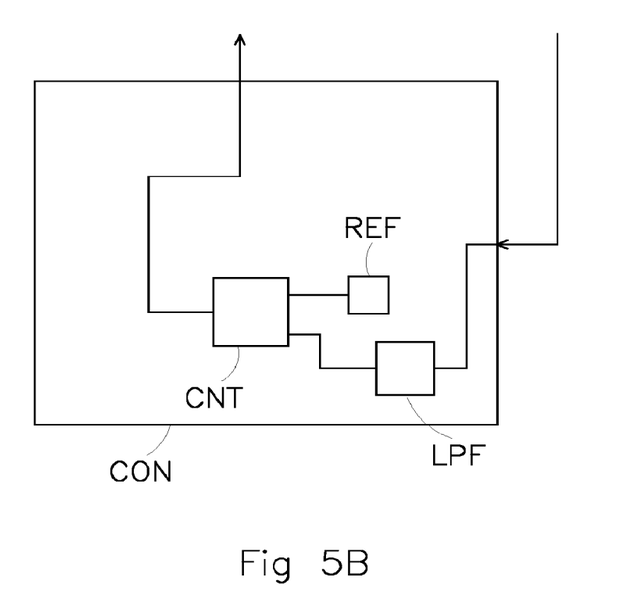
FIG. 5B shows a block schematic view of a control unit of the heave compensation system in accordance with FIG. 5A.

In order to accomplish that the power supply delivers a current at a magnitude substantially the same as the losses in the system, so that the energy level (and hence the charging) of the electrical storage element is maintained at a predetermined level, a control of the power supply may be provided. Thereto, the heave compensation system may comprise a control unit, an example of which having been depicted schematically in FIG. 5A. FIG. 5A depicts a heave compensation system which is substantially the same as the heave compensation system as depicted in and described with reference to FIG. 4, however a control unit CON has been added, which is further detailed in FIG. 5B as discussed below. The control unit comprises a control unit input that is connected to the power line PL (i.e. to the power supply output and the energy storage element). The control unit CON further comprises a control unit output that is connected to the power supply. The control unit is arranged to measure, at the control unit input an output voltage of the power supply, hence an electrical storage element voltage. The control unit is arranged to determine a time average of this voltage, for example by means of low pass filter LPF (etc averaging over one or more heave motion cycle times). The averaged power supply output voltage, hence the electrical storage element voltage provides information about an energy level as stored in the electrical storage element: in general: the higher the voltage, the higher the energy level. Thus, in case the averaged voltage increases, an energy level increases, and vice versa. The control unit further comprises a reference REF a value of which expresses a desired average voltage level and a controller CNT such as a proportional controller or a proportional integrating controller. The averaged power supply voltage from the filter LPF and the reference REF are provided to respective inputs of the controller. An output of the controller CNT is provided to the power supply for example to a setpoint input of the power supply that—in this embodiment—sets the power supply output current. The controller hence being arranged to compare the averaged power supply output voltage with the reference, hence a desired average energy level. In the form of a feedback control mechanism, the power supply is now controlled by the control unit so as to provide an output current that keeps the averaged power line voltage, hence the (average) energy level in the energy storage element, at a predetermined level. The control unit may comprise for example a proportional or a proportional/integrating controller. The constant output current of the power supply is hence controlled so as to maintain a level that substantially compensates energy losses.

The invention may not only be implemented using a current source (i.e. a high impedance power supply). Embodiments wherein use may be made of a low impedance power supply, will be discussed below.

Figure 6A:
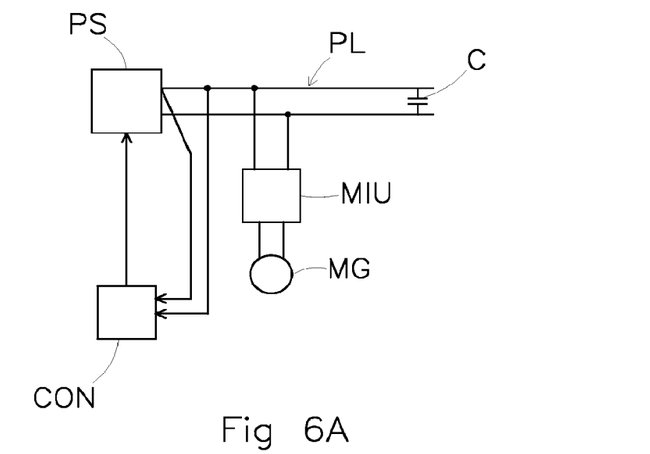

FIG. 6A schematically depicts a heave compensation similarly to FIGS. 4 and 5 comprising a power supply PS, an energy storage element C, a motor generator MG in this embodiment comprising a motor inverter unit MIU, and a power line PL. The power line PL electrically interconnecting the energy storage element C, the power supply PS and the motor generator (in this embodiment its motor inverter unit MIU). The energy storage element C, the motor generator MG and the power line PL may have functions substantially similar or identical as described above with reference to FIGS. 4 and 5 above. The heave compensation system further comprises a control unit CON that is further detailed in FIG. 6B.

Figure 6B:
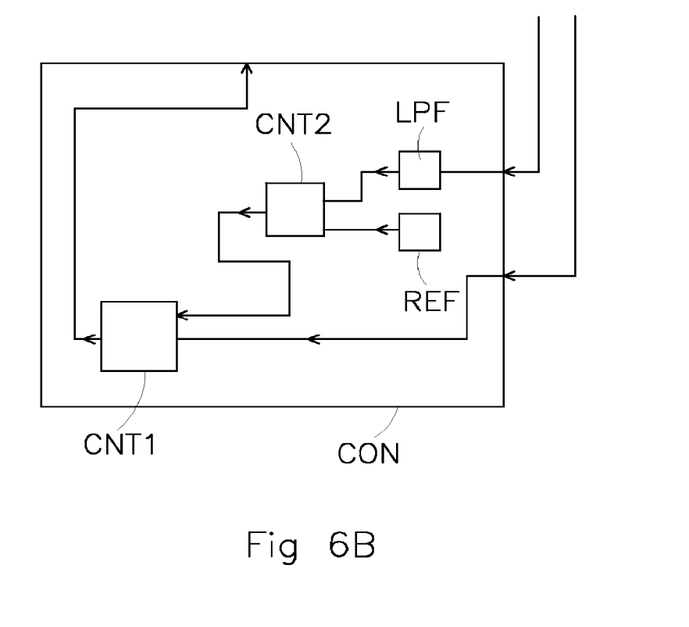
FIG. 6B shows a block schematic view of a control unit of the heave compensation system in accordance with FIG. 7A.

FIGS. 6A and 6B further depicts a double or combined input control loop architecture. Firstly, a power supply output current is measured and provided to the first controller CNT1 of the control unit CON. The first controller CNT1 compares the measured power supply output current with a reference (as will be discussed below). An output of the first controller CNT1 is connected to the power supply namely in this embodiment a power supply output voltage setpoint input to set an output voltage of the power supply. The first control loop hence measures the power supply output current, compares the power supply output current with a reference and drives the output voltage of the power supply accordingly. Hence, during each heave motion cycle, when the motor generator regenerates energy, the measured power supply current would tend to decrease (if the power supply voltage would be kept the same), which makes the first controller CNT1 to increase the power supply voltage and vice versa, so as to keep the power supply current substantially constant. Similarly to the embodiment described with reference to FIGS. 5A and 5B, a value of the power supply current is set by the other control loop by setting the reference (setpoint) value at the input of the first controller CNT1 to a suitable value. This is achieved as follows: similarly as described above with reference to FIGS. 5A and 5B, the power line voltage (which equals the power supply output voltage and the electrical storage element voltage) is measured. The control unit is arranged to measure, at a corresponding second control unit input an output voltage of the power supply, hence an electrical storage element voltage. The control unit is arranged to determine a time average of this voltage, for example by means of low pass filter LPF (etc averaging over one or more heave motion cycle times). The averaged power supply output voltage, hence the electrical storage element voltage provides information about an energy level as stored in the electrical storage element as explained above, in general: the higher the voltage, the higher the energy level. Thus, in case the averaged voltage increases, an energy level increases, and vice versa. The control unit further comprises a reference REF a value of which expresses a desired average voltage level and a second controller CNT2 such as a proportional controller or a proportional integrating controller. The averaged power supply voltage from the filter LPF and the reference REF are provided to respective inputs of the second controller CNT2. An output of the second controller CNT2 is provided as a reference to the first controller CNT1. The second controller CNT2 hence being arranged to compare the averaged power supply output voltage with the reference REF, hence expressing a desired average energy level. The first controller now drives the power supply voltage (during the heave motion cycle) so that a substantially constant current is provided by the power supply which current compensates energy losses in the heave compensation system. Thus, in the form of a feedback control mechanism, the power supply is now controlled by the control unit so as to provide an output current that keeps the averaged power line voltage, hence the (average) energy level in the energy storage element, at a predetermined level. The first and second controller may comprise for example a proportional or a proportional/integrating controller. The above described control loop comprising controller CNT1 which results in a substantially constant output current of the power supply is hence controlled so as to maintain a level that substantially compensates energy losses.

Figure 7:
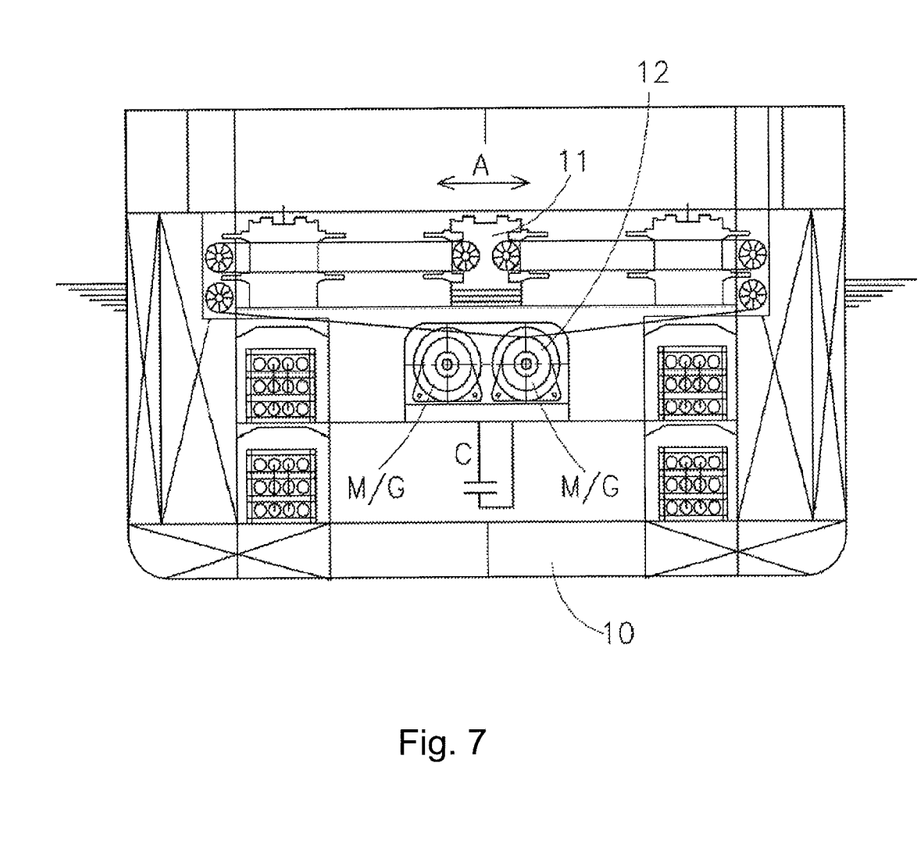
FIG. 7 shows a schematic cross section of a vessel with solid roll damping ballast.

An example of a heave motion compensated vessel is described in the international patent application PCT/NL2008/000221. It discloses a mono hull vessel with a heavy lift crane. In FIG. 7 a schematic cross section of the vessel is depicted. The vessel 10 is provided with an active roll damping mechanism. The active roll damping mechanism comprises a solid roll damping ballast 11 which is movable in the transverse direction of the hull (direction indicated by arrow A), a sensor detecting the rolling motion of the hull, and a drive and control system 12 operable to cause and control the movements of the solid roll damping ballast in response to the detections of the sensor to provide roll stabilization.

The drive and control system may be provided with a heave compensation system comprising a motor generator M/G and a energy storage C (such as a super capacitor with a converter) as described above to drive the solid roll damping mechanism. The movements of the solid roll damping ballast can be described as a cycle, as the ballast may be moved from larboard to starboard and vice versa. In the cycle, energy may be produced and stored in a first part the cycle and may be required in another part. It is to be understood that the damping ballast may not only be provided in transverse direction of the vessel, but also or instead in longitudinal direction.

The invention claimed is:

1. A power supply system for a vessel, the power supply system being configured to supply an electrical load, the electrical load exhibiting a load cycle which cycles about an average, the power supply system comprising:
   an electrical storage element for storing electrical energy;
   a power supply electrically connected to the electrical load and the electrical storage element for providing electrical power to at least the electrical load, the electrical storage element being connected to an output of the power supply, wherein an output voltage of the power supply is applied to the electrical storage element; and
   a control unit configured to control the power supply to let the output voltage of the power supply substantially follow, in synchronism with the load cycle, a charging and discharging voltage variation of the electrical storage element,
   wherein the control unit is further configured to control the power supply to cause the electrical storage element to cyclically store and release electrical energy in synchronism with the load cycle, including:
      when the electrical load is above the average, the control unit controls the power supply to lower the output voltage of the power supply in a part of the load cycle to release electrical energy from the electrical storage element; and
      when the electrical load is below the average, the control unit controls the power supply to raise the output voltage of the power supply in a part of the load cycle to store electrical energy in the electrical storage element.

2. The power supply system according to claim 1, wherein the power supply when controlled by the control unit, is arranged to provide a substantially constant output current.

3. The power supply system according to claim 1, wherein the control unit comprises an input connected to the power supply for measuring an output parameter of the power supply, and an output connected to the power supply for driving the power supply, the control unit being arranged to:
   compare the output parameter of the power supply with a control unit setpoint; and
   drive the power supply based on the comparison.

4. The power supply system according to claim 3, wherein the output parameter of the power supply is an output current of the power supply, and wherein the output of the control unit is connected to a power supply voltage setpoint input of the power supply.

5. The power supply system according to claim 3, wherein the output parameter of the power supply is a generator frequency signal and wherein the output of the control unit is connected to a power supply voltage setpoint input of the power supply.

6. The power supply system according to claim 3, wherein the control unit is arranged to determine the control unit set point from:
- time averaging an actual power supply output voltage of the power supply;
- comparing the time averaged actual power supply output voltage with a power supply output voltage setpoint; and
- deriving the control unit set point from a result of the comparison.

7. The power supply system according to claim 1, wherein the power supply is a current source.

8. The power supply system according to claim 7, wherein the control unit comprises an input connected to the power supply for measuring a power supply output voltage, and an output connected to the power supply for driving an output current of the power supply, the control unit being arranged to:
- determine a time average of the power supply output voltage;
- compare the time averaged power supply output voltage with a control unit setpoint; and
- drive the output current of the power supply based on the comparison.

9. The power supply system according to claim 1, wherein the control unit comprises a sensor to measure a variable representative of the load cycle, the control unit being arranged to drive the power supply from the measured variable.

10. The power supply system according to claim 1, wherein the electrical storage element comprises a super capacitor.

11. The power supply system according to claim 10, wherein the electrical storage element comprises a plurality of super capacitors and a voltage balancing to balance an operating voltage of the super capacitors.

12. The power supply system according to claim 10, wherein the super capacitors are arranged in at least one super capacitor bank, the or each super capacitor bank comprising two parallel circuit boards, the super capacitors of the respective super capacitor bank being arranged and extending between the circuit boards.

13. The power supply system according to claim 1, wherein the control unit comprises a sensor for measuring a variable representative of a load variation to be compensated, the control unit being arranged to drive the motor generator on the basis of the measured variable.

14. The power supply system according to claim 1, wherein the load comprises a vessel motion damping ballast which is movable in a transverse or longitudinal direction of a vessel.

15. A vessel comprising the power supply system according to claim 1.

16. A power supply load variation compensation method to at least partly compensate a load cycle of an electrical load of a vessel power supply system, the load cycle cycling about an average, the method comprising the steps of:
- providing by a power supply electrical power to at least the electrical load, the power supply being electrically connected to the electrical load and an electrical storage element, the electrical storage element being connected to an output of the power supply, wherein an output voltage of the power supply is applied to the electrical storage element;
- controlling the power supply by a control unit to let the output voltage of the power supply substantially follow, in synchronism with the load cycle, a charging and discharging voltage variation of the electrical storage element; and
- controlling the power supply by the control unit to cause the electrical storage element to cyclically store and release electrical energy in synchronism with the load cycle, including:
  - when the electrical load is above the average, controlling the power supply to lower the output voltage of the power supply in a part of the load cycle to release electrical energy from the electrical storage element; and
  - when the electrical load is below the average, controlling the power supply to raise the output voltage of the power supply in a part of the load cycle to store electrical energy in the electrical storage element.

17. The method according to claim 16, wherein the power supply when controlled by the control unit, provides a substantially constant output current.

18. The method according to claim 17, wherein the controlling of the power supply by a control unit further comprises the steps of:
- measuring an output parameter of the power supply;
- comparing the output parameter of the power supply with a control unit setpoint; and
- driving the power supply based on the comparison.

19. The method according to claim 18, wherein the output parameter of the power supply is an output current of the power supply and wherein driving the power supply based on the comparison comprises driving an output voltage setpoint input of the power supply.

20. The method according to claim 18, wherein the output parameter of the power supply is a generator frequency signal and wherein driving the power supply based on the comparison comprises driving an output voltage setpoint input of the power supply.

21. The method according to claim 18, wherein the control unit set point is determined from time averaging an actual power supply output voltage of the power supply, comparing the time averaged actual power supply output voltage with a power supply output voltage setpoint, and deriving the control unit set point from a result of the comparison.

22. The method according to claim 16, wherein a variable representative of the load cycle is measured by a sensor and wherein the power supply is driven from the measured variable.

23. The power supply system according to claim 1, wherein the electrical load to draw energy from the power supply system in a first part of the load cycle and to regenerate at least part of the energy in a second part of the load cycle.

24. The power supply system according to claim 1, wherein the electrical load is a motor-generator of an active heave compensation system and wherein the load cycle is a heave motion cycle.

25. The method according to claim 16, further comprising the steps of:
- driving the electrical load in a first part of the load cycle;
- regenerating at least part of the energy with which the load has been driven, in a second part of the load cycle; and
- storing the regenerated energy in the electrical storage element.

26. The method according to claim 16, wherein the electrical load is a motor-generator of an active heave compensation system and wherein the load cycle is a heave motion cycle.

\* \* \* \* \*